(12) United States Patent
Harnish et al.

(10) Patent No.: US 8,959,453 B1
(45) Date of Patent: Feb. 17, 2015

(54) AUTOHIDING VIDEO PLAYER CONTROLS

(75) Inventors: Philip T. Harnish, San Francisco, CA (US); Brian Glick, San Francisco, CA (US)

(73) Assignee: Google Inc., Mountain View, CA (US)

( * ) Notice: Subject to any disclaimer, the term of this patent is extended or adjusted under 35 U.S.C. 154(b) by 15 days.

(21) Appl. No.: 13/469,010

(22) Filed: May 10, 2012

(51) Int. Cl.
G06F 3/048 (2013.01)
G06F 3/0482 (2013.01)
G06F 3/0481 (2013.01)

(52) U.S. Cl.
CPC .......... *G06F 3/0482* (2013.01); *G06F 3/04817* (2013.01)
USPC ........... 715/788; 715/765; 715/722; 715/719; 715/720; 715/800; 715/801

(58) Field of Classification Search
CPC ........................... G06F 3/0482; G06F 3/04817
USPC ......... 715/716–722, 764–768, 771–810, 866, 715/243–253
See application file for complete search history.

(56) References Cited

U.S. PATENT DOCUMENTS

| | | | | |
|---|---|---|---|---|
| 5,699,535 A * | 12/1997 | Amro | ............................. | 715/800 |
| 6,934,743 B2 * | 8/2005 | Huat | ............................. | 709/218 |
| 7,216,302 B2 * | 5/2007 | Rodden et al. | ................ | 715/815 |
| 2005/0229110 A1 * | 10/2005 | Gegner et al. | ................. | 715/800 |
| 2006/0236264 A1 * | 10/2006 | Cain et al. | ...................... | 715/788 |
| 2007/0024706 A1 * | 2/2007 | Brannon et al. | .............. | 348/142 |
| 2007/0136685 A1 * | 6/2007 | Bhatla et al. | .................. | 715/800 |
| 2008/0229232 A1 * | 9/2008 | Schulz et al. | ................. | 715/781 |
| 2009/0171920 A1 * | 7/2009 | Wade et al. | ....................... | 707/4 |
| 2012/0066642 A1 * | 3/2012 | Shi | .................... | 715/800 |
| 2012/0223934 A1 * | 9/2012 | Takami | ......................... | 345/418 |
| 2013/0167073 A1 * | 6/2013 | Ari et al. | ....................... | 715/798 |

OTHER PUBLICATIONS

Adobe Systems Incorporated, "ActionScript 3, Auto hide player controlbar when video fullscreen" Jul. 28, 2011, 9 Pages [online] [retrieved on Jan. 14, 2013] Retrieved from the internet <URL: http://forums.adobe.com/thread/883033>.

* cited by examiner

*Primary Examiner* — Patrick Riegler
*Assistant Examiner* — Justin R Blaufeld
(74) *Attorney, Agent, or Firm* — Fenwick & West LLP

(57) ABSTRACT

Methods are described for maximizing the size of a video displayed in a display area of a video player. The maximum height of the video is determined using its aspect ratio and the dimensions of the display area in the video player. The control panel is removed from the display in the video player if this allows the video to be shown at its maximum height while preserving the video's resolution. The control panel is displayed in the video player if the video can be shown at its maximum height without removing the control panel from the display.

14 Claims, 6 Drawing Sheets

AUTOHIDING VIDEO PLAYER CONTROLS

BACKGROUND

1. Field of Invention

This disclosure relates generally to methods and systems for maximizing the size of a video that is displayed in a video player.

2. Description of the Related Art

Users of online video services view videos on web-based applications, video players, or applications on mobile devices. Each video has an aspect ratio that defines the ratio of height to width of the video at which it should be viewed. Video players or video playing services, such as Vimeo or iTunes, typically provide a default or fixed video display area, the aspect ratio of which does not always match the aspect ratio of the video being shown. If the video player is enlarged or reduced in size by a user or the application, the video is resized to fit within the display area of the video player, while maintaining the aspect ratio of the video.

Conventional video players include a control panel in the display area for controlling the playback of the video, such as start, pause, skip forward and backward. The controls can be part of a fixed panel in the video display, and in some video players, the control panel is automatically, selectively displayed or hidden based on a user's interactions, such as movement of a cursor or indicator over a designated control panel display area. One problem with this approach to automatically hiding or displaying the controls is that the size of the video is often reduced in order to accommodate the display of the control panel, since the control panel takes up some of the available display area. A reduction in the size of the video can leave unused space on either side of the display area, if the player attempts to preserve the aspect ratio of the video, essentially wasting usable display space. Also the reduction in the size of the video typically makes the viewing experience less enjoyable to the user. In some video players, the control panel covers up part of the video, such as the bottom portion of the video, and this reduces the viewable portion of the video. Current systems do not correlate the display of the control panel with the size of the video within the video player.

SUMMARY

Methods and systems are provided for maximizing the size of a video that is displayed in display area of a video player, while at the same time enabling the display of the control panel. The system receives a request for a video for viewing in a video player. The system receives data about the height and width of the display area in the video player, the display area's aspect ratio, and the video's aspect ratio. The height and width of the display area of the video player can be set by the dimensions of the video player or by the browser, in some cases. The maximum height and width of the video are determined using the height and width of the display area, the display area's aspect ratio, and the video's aspect ratio.

Once the maximum height of the video is determined, the video player can automatically determine whether to display the control panel in the display area as well. If the maximum video height of the video is greater than the difference between the total height of the display area and the height of the control panel, then the control panel is removed from the display. If the maximum height of the video is less than or equal to the difference between the total height of the display area and the height of the control panel, then the control panel is displayed in the display area.

By determining whether to display or hide the control panel, the video can be displayed at its maximum size and highest resolution, using the pre-determined aspect ratios of the video player and the video itself. The determination to display or hide the control panel to maximize the size of the video is not dependent on a user's behavior (e.g., displaying the control panel when a user placing a cursor over the control panel area or automatically hiding the control panel when a user requests a full screen display).

The features and advantages described in this summary and the following detailed description are not limiting. Many additional features and advantages will be apparent to one of ordinary skill in the art in view of the drawings, specification, and claims hereof.

The figures depict various embodiments for purposes of illustration only. One skilled in the art will readily recognize from the following discussion that alternative embodiments of the structures and methods illustrated herein may be employed without departing from the principles of the disclosure described herein.

DETAILED DESCRIPTION

Overview

Described herein are various embodiments of systems, methods, and computer-readable storage media for automatically displaying or hiding a control panel on a video player to show a video at its maximum size in a display area of the video player.

Figure 1:
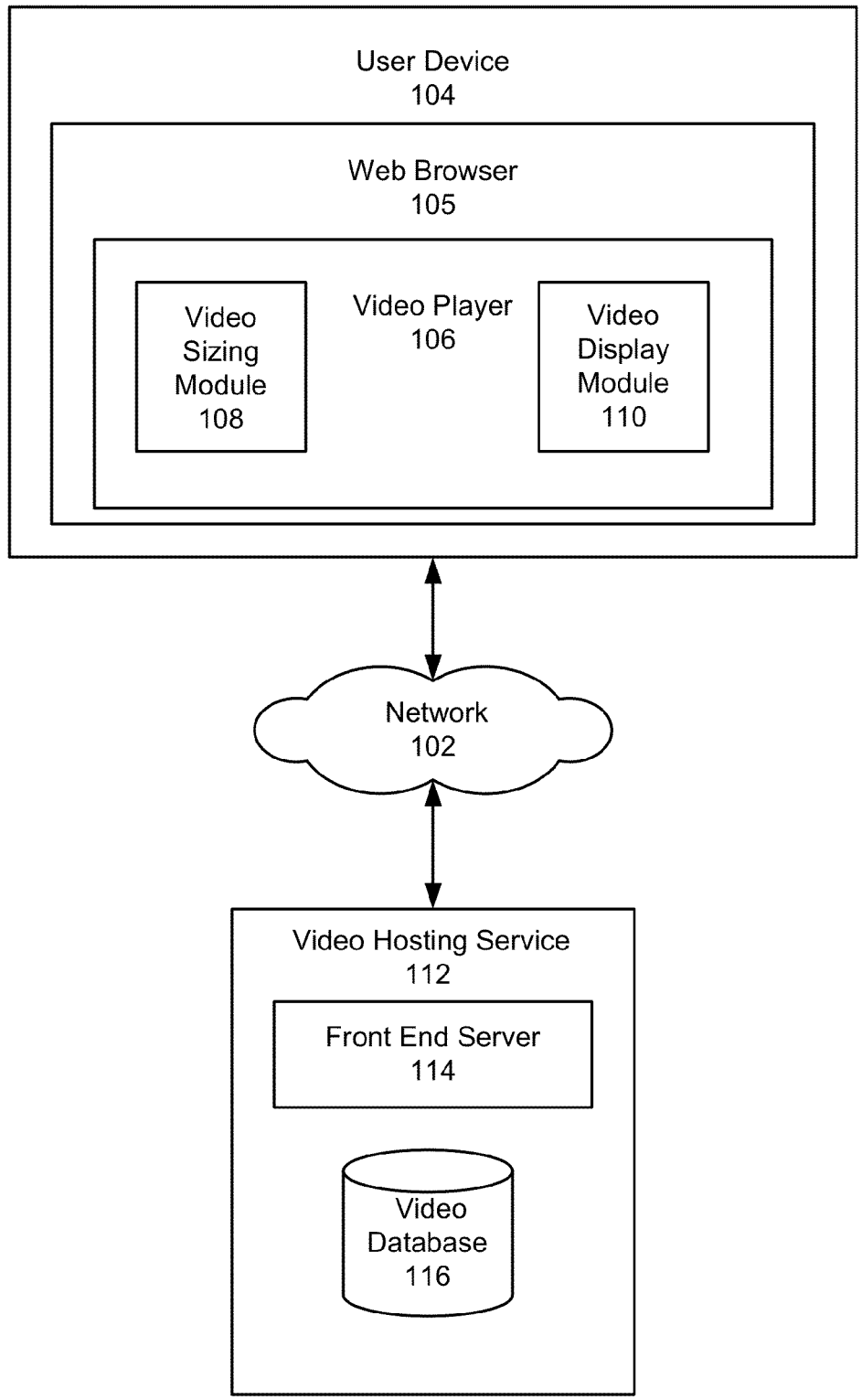
FIG. 1 is a high level block diagram of a system environment, according to one embodiment of the invention.

FIG. 1 is a high level block diagram of a system environment 100, according to one embodiment of the invention. The system environment 100 includes a network 102, a user device 104 and a video hosting service 112.

The network 102 represents the communication pathway between the user device 104 and the video hosting service 112. In one embodiment, the network 102 is the Internet and uses standard communications technologies and/or protocols. The network 102 can also utilize dedicated, custom, or private communications links that are not necessarily part of the Internet. The network 102 may comprise any combination of local area and/or wide area networks, using both wired and wireless communication systems.

The user device 104 includes one or more devices with computing functionality and data communication capabilities. The user device 104 can receive inputs from a user and can transmit and receive data via the network 102. The user device 104 can include a display to present content to a user of the device 104. The user device 104 can be a mobile device, such as a mobile phone, a tablet, a personal digital assistant (PDA), or a desktop computer. The user device includes a video player 106 that can play embedded content or multimedia content, such as videos.

The video player 106 can be an application in a web browser 105 or a stand-alone application on the user device 104. The video player 106 displays videos in a display area or window of the player. The size of the display area can be determined based on size settings that are predetermined in the video player 106 (or the size settings of the web browser 105 that embeds the video). In some cases, the size of the display area can also be adjusted by a user of the video player 106 to maximize the size of a web browser 105 (e.g., to a full screen size). The display area of the video player has a player width $P_W$ and a player height $P_H$. The video player 106 also includes a video sizing module 108 and a video display module 110, which are described in detail below.

The user may communicate through the user device 104 with the video hosting service 112 over the network 101. The video hosting service 112 can be implemented at least in part using web-based technologies to support a website. For example, the user device 104 can execute a web browser 105 that allows the user to view web pages and videos provided by the video hosting service 112.

The video hosting service 112 represents any system that allows users to access video content via searching and/or browsing interfaces. The sources of videos can be from uploads of videos by users, searches or crawls of other websites or databases of videos, or the like, or any combination thereof. For example, a video hosting service 112 can be configured to allow upload of content by users. A video hosting service 112 can also be configured to only obtain videos from other sources by crawling such sources or searching such sources in real time.

The video hosting service 112 can receive and send multimedia content, such as videos, video files, or video items, but can receive and share content of any media type and file type. A suitable video hosting service 112 for implementation of the system is the YOUTUBE™ website; other video hosting services are known as well, and can be adapted to operate according to the teaching disclosed herein.

The video hosting service 112 includes a front end server 114, which handles communication with the user device 104 via the network 110. The front end server 114 receives requests from user devices 104 and communicates with the other servers of the video hosting service 112 to process the requests (e.g., requests for videos). For example, if a user requests to access a video, the front end server 114 makes sure that the proper servers process the request and that the video is transmitted to the user. The video hosting service 112 also includes video database(s) 116 that store a plurality of videos and metadata of the videos for the video hosting service 112. In some embodiments, an external video database or third party server can be used to store videos.

Referring back to the video player 106, the video player 106 includes a video sizing module 108. The video sizing module 108 sends a user's request for a video to the video hosting service 112. In return, the video sizing module 108 receives the video stream for the video and metadata about the video from the video hosting service 112. For example, the video sizing module 108 can receive data about the acceptable sizing formats for the video to be displayed in the video player 106. Exemplary format settings are 240 p, 360 p, 480 p, 720 p, or 1080 p, which are described below.

The metadata received with the video can include the aspect ratio of the video. The aspect ratio of the video $V_{AR}$ is the ratio between the width and the height of the video image. The aspect ratio is used to determine the actual height and width of the video for display in the video player 106. Common aspect ratios for video include 1.333:1 (4:3, NTSC), 1.66:1 (5:3, European widescreen), 1.77:1 (HD Standard), 1.85:1 (widescreen), 2.39:1 (widescreen). These available formats for the video are sent to the video sizing module 108.

The video sizing module 108 also receives as input the aspect ratio $P_{AR}$ of the display area of the video player 106, and the height $P_H$ and width $P_W$ of the display area of the video player 106. The aspect ratio $P_{AR}$ of the display area of the video player 106 is equal to the ratio of the width of the video player 106 over the height of the video player 106.

$$P_{AR}=P_W/P_H.$$

The player width $P_W$ is the maximum width available of the display area, and the player height $P_H$ is the maximum height available of the display area. For instance, if the display area of the player is restricted to a player width $P_W$ of 720 pixels, and the aspect ratio is 4:3, then the player height $P_H$ would be set at 540 pixels (e.g., 4:3=720:540).

Using the given aspect ratio of the display area $P_{AR}$, the aspect ratio of the video $V_{AR}$, and the known width $P_W$ and height $P_H$ of the display area, the video sizing module 108 determines the maximum video height $V_H$ of the video. The maximum video height $V_H$ is equal to the width of the display area $P_W$ divided by the aspect ratio of the display area $V_{AR}$:

$$V_H=P_W/V_{AR}$$

The maximum video height of the video is the maximum allowable height based on the video's aspect ratio and is set to be equal to or less than the total height of the video player 106: $V_H \leq P_H$. The maximum video height of the video is measured in pixels.

To illustrate, assume that the display area has an aspect ratio of 4:3, and a player height $P_H$ of 540 pixels, and a player width $P_W$ of 720 pixels. Next, if the video has an aspect ratio of 4:3, then the following calculation is performed:

$$V_H=P_W/V_{AR}=720/(4/3)=540$$

The maximum video height $V_H$ is 540 pixels. The maximum video height equals the total height of the video player 106, in this example.

Figure 2A:
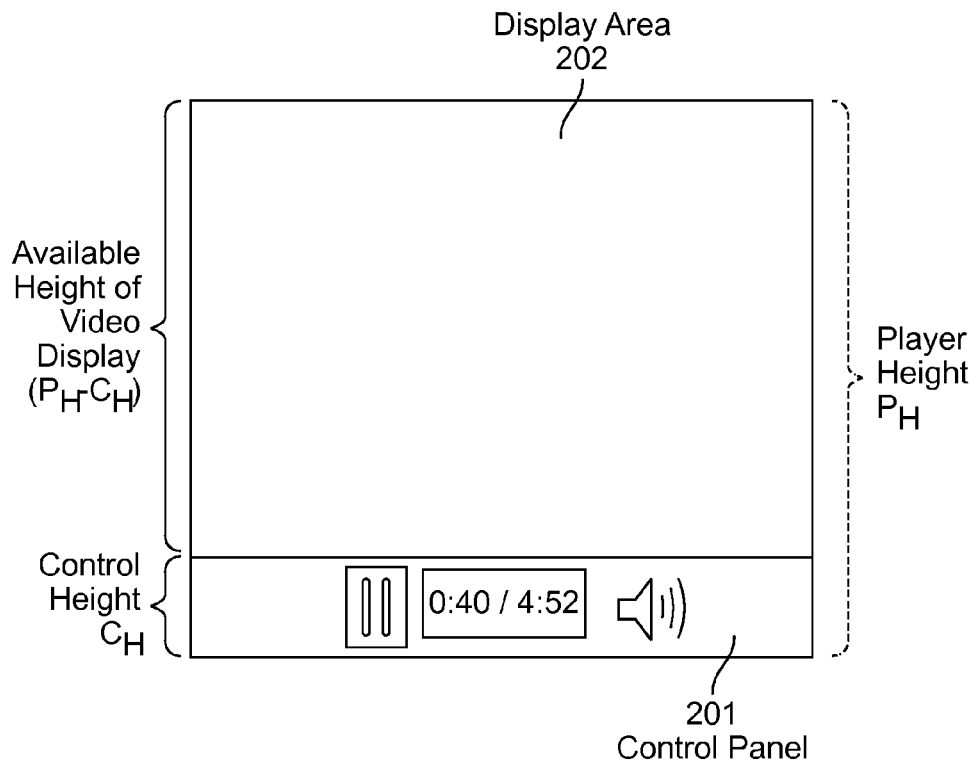
FIGS. 2A and 2B are examples of a display of a video in a video player, according to one embodiment of the invention.
Figure 2B:
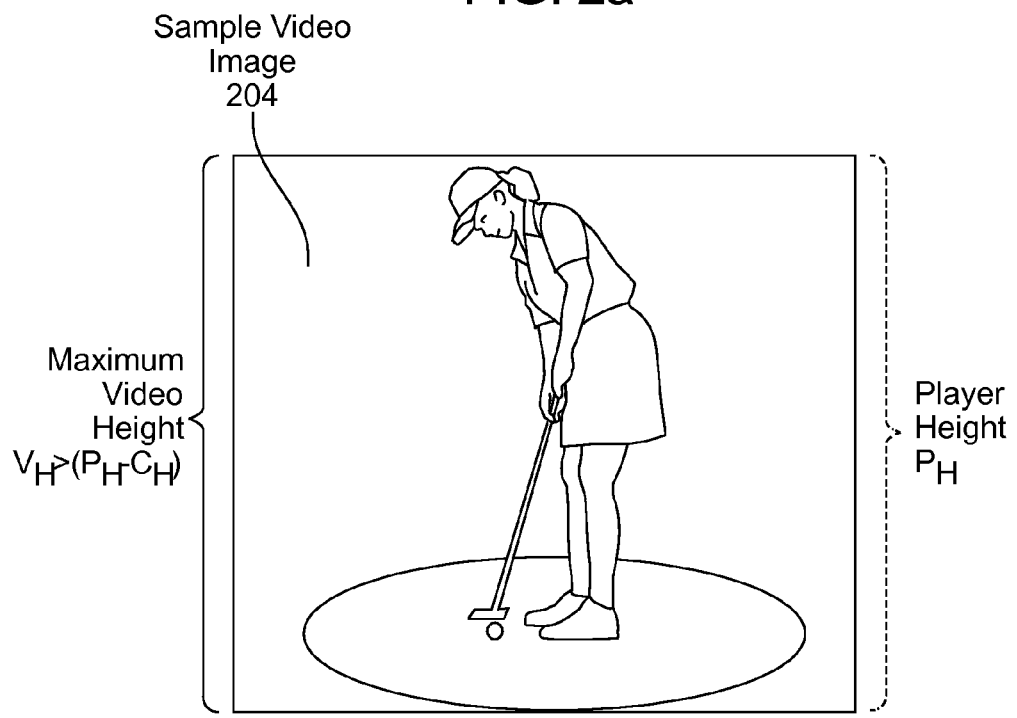

Next, the video sizing module 108 receives the dimensions (height $C_H$ and width $C_W$) of a control panel from the video player 106. The control height $C_H$ is used as input in the calculations described below. The control panel includes the controls for the video player 106, such as a volume control button, a play or pause button, a stop button, a time tracker, rewind and fast forward buttons, size adjustment or full screen control button, etc. The control panel's dimensions are typically determined by the specifications of the video player 106. The control panel is displayed within the display area of the video player 106 and can be displayed horizontally across the bottom of the video player 106. FIGS. 2*a* and 2*b* illustrate an example of a control panel in a display panel, which is described in detail below.

The video sizing module 108 then determines whether to display the control panel in the display area. This determination is based on a comparison of (i) the maximum video height $V_H$ and (ii) the difference between the total player height $P_H$ and the height of the control panel $C_H$. The available height for displaying the video is the difference between the total player height and the control panel height ($P_H - C_H$).

In one example, if $V_H > (P_H - C_H)$, then the control panel is not displayed in the video player 106. In other words, if the video has a maximum video height $V_H$ for display that is larger than the available height in the video player 106 when the control panel is displayed, then the control panel is not displayed in the video player 106. In this case, the maximum video height $V_H$ is set equal to the $P_H$. Then the video width $V_W$ is set by the equation:

$$V_W = V_H \times V_{AR}.$$

In this case, the display of the video in the video player 106 is said to be "height constrained".

Alternatively, if $V_H \leq (P_H - C_H)$, the control panel is displayed in the video player 106. If the maximum height $V_H$ of the video is less than the available height $(P_H - C_H)$ for displaying the video, then the control panel is displayed because the video can fit inside the display area at its maximum height when the control panel is displayed. In this case, the video width $V_W$ is set equal to the width of the video player $P_W$. Next, the maximum video height $V_H$ is set by the equation:

$$V_H = V_W / V_{AR}.$$

In this case, the display of the video is said to be "width constrained".

In some cases, the maximum video height $V_H$ is further constrained by standard dimensions and resolutions for display. The video sizing module 108 can select a video stream with the highest resolution for streaming the video that would match or be closest to the previously calculated maximum possible video height $V_H$. For instance, the following data streams could be used: 240 p, 360 p, 480 p, 720 p, or 1080 p. If the maximum video height $V_H$ is calculated to be 400 pixels, then the video sizing module 108 would select 480 p as the data stream with at least the maximum possible video height $V_H$. The maximum possible video height $V_H$ can be rescaled to match the data stream with the closest maximum height and resolution. Rescaling is typically scaled downward, in most cases.

Next, the video sizing module 108 sends to the video display module 110 the maximum calculated dimensions $V_H$ and $V_W$ of the video to be displayed in the video player 106 and instructions about whether to include the display of the control panel.

The video display module 110 formats and displays the video in the display area using the maximum calculated dimensions $V_H$ and $V_W$ of the video. The video display module 110 also displays or hides the control panel.

The video display module 110 also centers the video in the display area. Centering of the video within the display area can occur in the vertical dimension if the video is width constrained, or in the horizontal dimension, if the video is height constrained, as described above.

FIGS. 2a and 2b show an example of a display of a video in a display area 202 of a video player 106, according to one embodiment of the invention. A video player's display area 202 is shown with a control panel 201. The video player 106 has three measurements: a total player height $P_H$ of the video player, a control panel height $C_H$, and a total available height for the video display, $P_H - C_H$. As shown in FIG. 2b, the maximum video height $V_H$ has been calculated to be greater than the difference between the player height and the control height, $V_H > (P_H - C_H)$. In this case, the maximum video height $V_H$ is set equal to the player height $P_H$, and the control panel 201 is removed from the display. A sample video image 204 is shown at the maximum video height $V_H$.

Figure 3A:
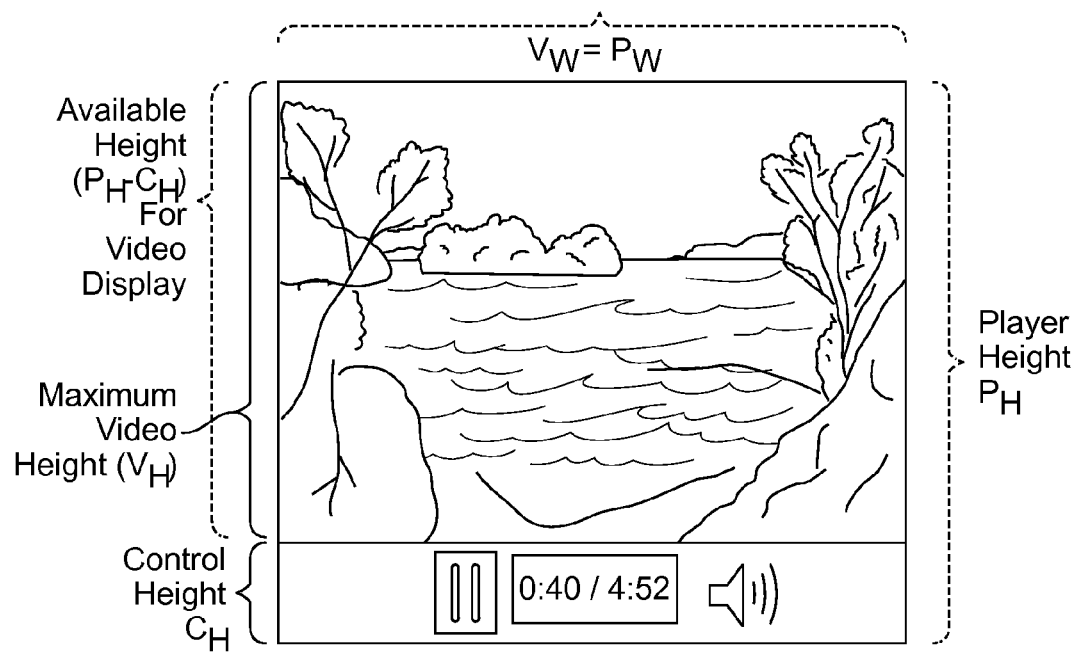
FIGS. 3A and 3B are examples of the display of videos in video players, according to an embodiment of the invention.
Figure 3B:
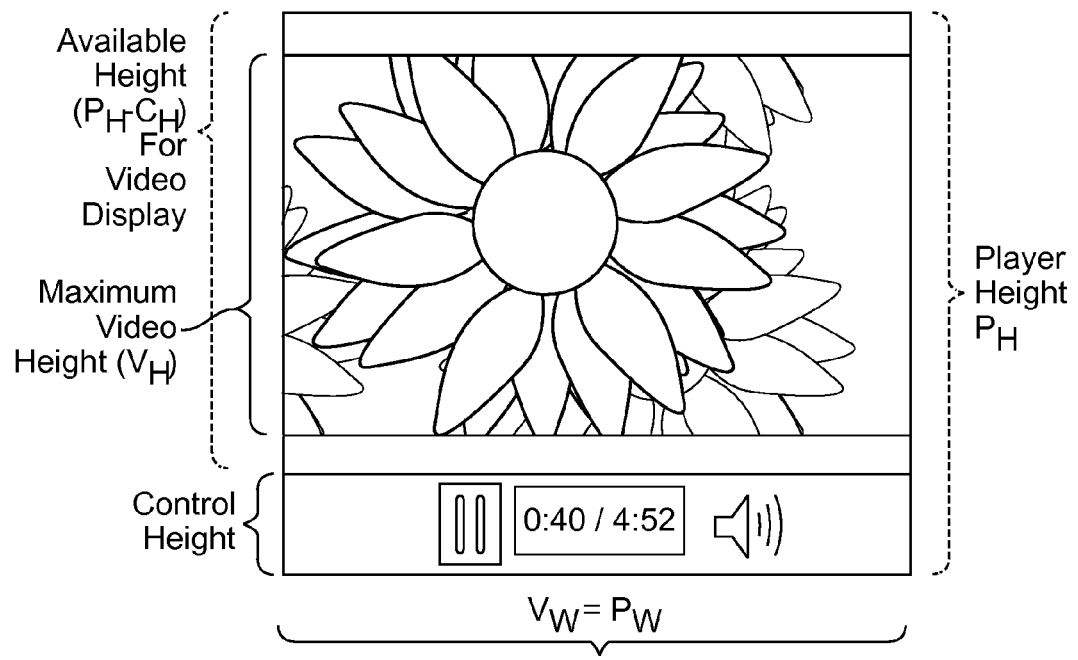

FIGS. 3a and 3b show examples of the display of videos in video players 106, according to an embodiment of the invention. In both figures, the maximum video height $V_H$ has is less than or equal to the difference between the player height and the control height, e.g., $V_H \leq (P_H - C_H)$. In FIG. 3a, where $V_H \leq (P_H - C_H)$, the video width $V_W$ is set equal to the player width $P_W$. Next, the $V_H$ is set to be equal to $V_W / V_{AR}$. In FIG. 3b, the video width $V_W$ is also set to be equal to the player width $P_W$. In addition, the $V_H$ is less than the available height for video display $(P_H - C_H)$, and the video image is centered vertically in the available height for video display, resulting in black areas or unused space above and below the video image.

Figure 4:
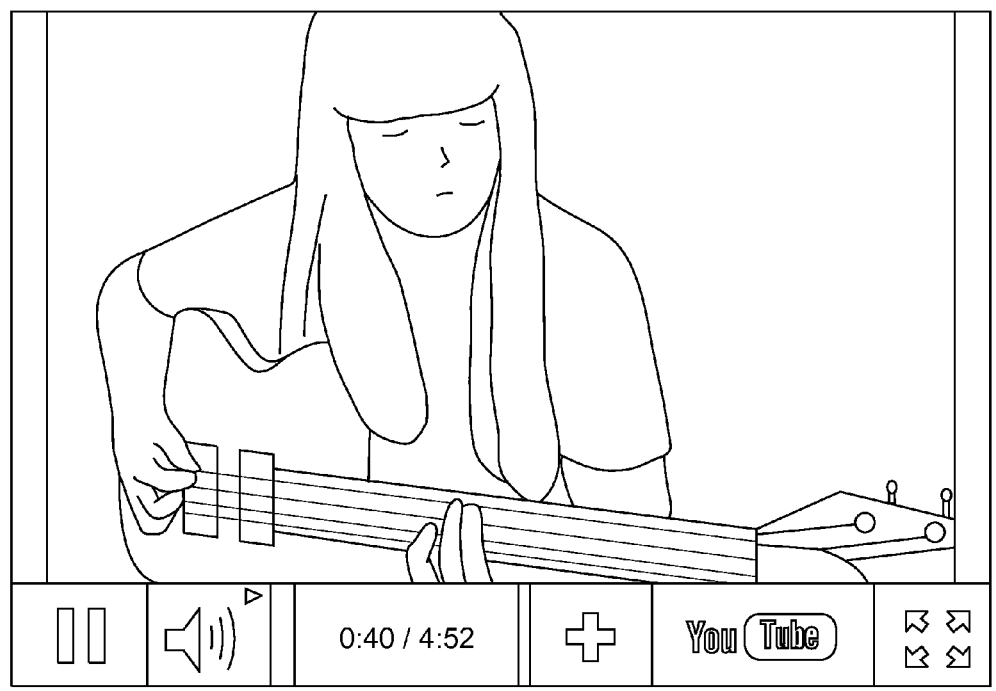
FIG. 4 is an example of a display of a video in a video player, according to one embodiment of the invention.

FIG. 4 is example of a display of a video in a video player 106, as would be found in a conventional video player, where the video has not been maximized in size in the display area, and the control panel 201 is displayed. As shown in FIG. 4, the maximum height of the video has not been used to display the video, and this results in a smaller picture with black bars positioned on the left and right sides of the video in the display area.

Figure 5:
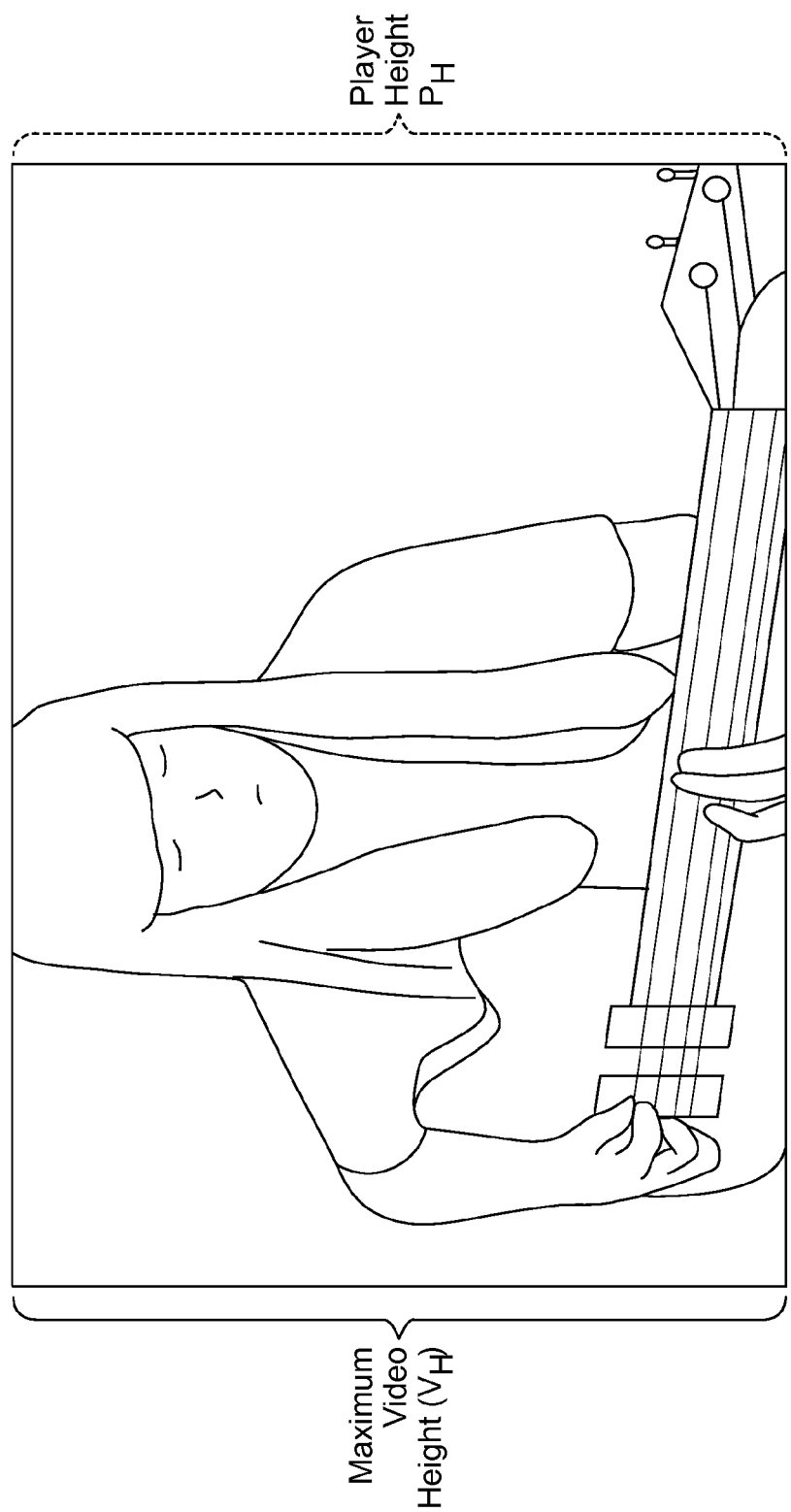
FIG. 5 is an example of a display of a video in a video player, according to one embodiment of the invention.

FIG. 5 illustrates how the video in FIG. 4 would be displayed in a video player 106, according to an embodiment of the invention. Here, the maximum video height $V_H$ is determined to be greater than the difference between the player height and the control height, $V_H > (P_H - C_H)$. The maximum video height $V_H$ is set to be equal to the player height $P_H$, the control panel 201 is removed from the display, and the video height is maximized, such that $P_H = V_H$. As a result, the video is shown in its maximum height, without the control panel covering any portion of the video, and without any wasted space on the left and right sides of the video.

Figure 6:
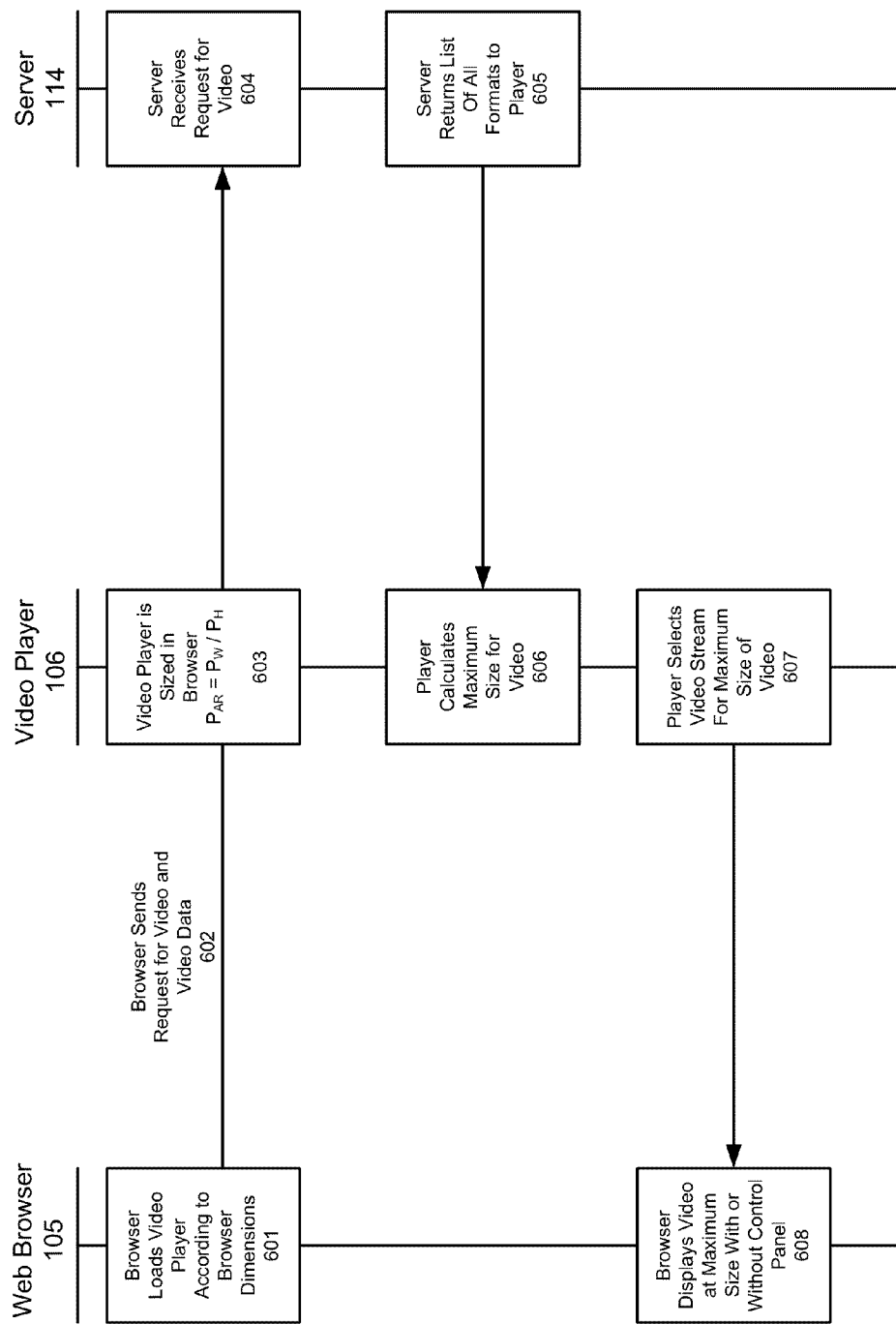
FIG. 6 is a flow diagram for a method of displaying a video in a video player, according to one embodiment of the invention.

FIG. 6 is a flow diagram for a method of displaying a video in a display area of a video player 106, according to one embodiment of the invention. The web browser 105 receives a request to display a video from a user, and the browser 105 loads 601 the video player 106 on the web page. The video player 106 is sized 603 according to its aspect ratio in the web browser 105, and the video player has a player width $P_W$ and a player height $P_H$ for its display area. The video player 106 (via the video sizing module 108, for example) sends a request to the server 114 for the selected video and its metadata. The server 114 receives 604 the request for the video. The server 114 returns 605 the selected video stream and a list of appropriate formats for displaying the video (which includes the aspect ratio). The video player 106 receives the data and calculates a maximum size ($V_H$ and $V_W$) for the video, using the methods described above, and determines whether the control panel should be displayed. The video player 106 then selects 607 the best video stream that is closest to or matches the maximum calculated size of the video. The browser 105 then displays 608 the video, either with or without the control panel 201.

In some embodiments, the steps described above for determining the maximum height of the video and determining whether to display the control panel are performed on the server side, for example, by a video hosting service 112 or front end server 114.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for displaying a video in a video player, the method comprising:
    receiving a total player height and a total player width of a display area of the video player;
    receiving a height for a control panel of the video player, the control panel displayed horizontally across the bottom of the video player;
    determining a maximum video height for displaying the video within the display area, the maximum height based on an aspect ratio of the video, the total player height, and the total player width;
    comparing the maximum video height to a difference between the total player height and the height of the control panel to determine whether the video can be displayed at a larger size if the control panel is hidden;
    responsive to the maximum video height for the video being less than or equal to the difference between the total player height and the height of the control panel, instructing the video player to maintain the display of the control panel in the display area; and
    responsive to the maximum video height for the video being greater than the difference between the total player height and the height of the control panel, instructing the video player to hide the control panel from the display area and display the video at the larger size.

2. The computer-implemented method of claim 1, wherein displaying the video at the larger size comprises setting an actual height of the video equal to the total player height.

3. The computer-implemented method of claim 1, further comprising:
    responsive to the maximum video height for the video being less than or equal to the difference between the total player height and the height of the control panel, setting an actual width of the video equal to the total player width.

4. The computer-implemented method of claim 1, further comprising selecting a video stream with the highest resolution for streaming the video that would match or be closest to the maximum video height of the video.

5. The computer-implemented method of claim 1, wherein the video is centered in the display area of the video player.

6. A computer program product having a non-transitory computer-readable storage medium having computer-executable instructions for displaying a video in a video player, the computer program product comprising:
    a video hosting service configured to:
        send a video stream to the video player including data about the aspect ratio of the video;
    a video sizing module configured to:
        receive a total player height and a total player width of a display area of the video player;
        receive a height for a control panel of the video player, the control panel displayed horizontally across the bottom of the video player;
        determine a maximum video height for displaying the video within the display area, the maximum height based on the aspect ratio of the video, the total player height, and the total player width;
        compare the maximum video height to a difference between the total player height and the height of the control panel to determine whether the video can be displayed at a larger size if the control panel is hidden;
        responsive to the maximum video height for the video being less than or equal to the difference between the total player height and the height of the control panel, instructing the video player to maintain the display of the control panel in the display area; and
        responsive to the maximum video height for the video being greater than the difference between the total player height and the height of the control panel, instructing the video player to hide the control panel from the display area and display the video at the larger size.

7. The computer program product of claim 6, wherein displaying the video at the larger size comprises setting an actual height of the video equal to the total player height.

8. The computer program product of claim 6, wherein the video sizing module is further configured to:
    responsive to the maximum video height for the video being less than or equal to the difference between the total player height and the height of the control panel, set an actual width of the video equal to the total width of the display area.

9. The computer program product of claim 6, wherein the video sizing module is configured to select a video stream with the highest resolution for streaming the video that would match or be closest to the maximum video height of the video.

10. The computer program product of claim 6, wherein the video sizing module is configured to display the video centered in the display area of the video player.

11. The computer-implemented method of claim 1, wherein instructing the video player to hide the control panel comprises instructing the video player to hide all controls for controlling playback of the video.

12. The computer program product of claim 6, wherein instructing the video player to hide the control panel comprises instructing the video player to hide all controls for controlling playback of the video.

13. The computer-implemented method of claim 1, further comprising:
   displaying the video in the video player at the larger size.

14. The computer program product of claim 6, wherein the video player displays the video at the larger size.

* * * * *